United States Patent
Hoshino

(10) Patent No.: US 9,588,287 B2
(45) Date of Patent: Mar. 7, 2017

(54) MULTIMODE OPTICAL FIBER

(71) Applicant: SUMITOMO ELECTRIC INDUSTRIES, LTD., Osaka-shi, Osaka (JP)

(72) Inventor: Sumio Hoshino, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 14/818,841

(22) Filed: Aug. 5, 2015

(65) Prior Publication Data

US 2017/0038528 A1   Feb. 9, 2017

(51) Int. Cl.
  G02B 6/036   (2006.01)
  G02B 6/028   (2006.01)
  G02B 6/12    (2006.01)

(52) U.S. Cl.
  CPC ....... *G02B 6/03694* (2013.01); *G02B 6/0288* (2013.01); *G02B 6/03627* (2013.01); *G02B 2006/1209* (2013.01)

(58) Field of Classification Search
  CPC .. G02B 6/03627; G02B 6/0288; G02B 6/036; G02B 2006/1209
  See application file for complete search history.

(56) References Cited

U.S. PATENT DOCUMENTS

| | | | |
|---|---|---|---|
| 4,447,124 A | 5/1984 | Cohen | |
| 4,691,990 A * | 9/1987 | Cohen | G02B 6/03627 385/127 |
| 6,327,403 B1 * | 12/2001 | Danziger | G02B 6/03644 385/126 |
| 8,879,878 B2 * | 11/2014 | Bigot-Astruc | G02B 6/0288 385/126 |
| 9,014,525 B2 * | 4/2015 | Molin | G02B 6/03627 385/127 |
| 9,031,371 B2 * | 5/2015 | Yonezawa | G02B 6/0281 385/124 |
| 9,329,335 B2 * | 5/2016 | Balemarthy | G02B 6/0288 |
| 2011/0123161 A1 * | 5/2011 | Molin | G02B 6/0365 385/124 |
| 2012/0039361 A1 * | 2/2012 | Gooijer | G02B 6/0281 374/161 |
| 2012/0263427 A1 * | 10/2012 | Hirano | C03B 37/01211 385/142 |

FOREIGN PATENT DOCUMENTS

| | | |
|---|---|---|
| JP | S63-25242 A | 2/1988 |
| JP | 2003-315184 A | 11/2003 |
| JP | 2006-117470 A | 5/2006 |

* cited by examiner

*Primary Examiner* — Daniel Petkovsek
(74) *Attorney, Agent, or Firm* — Drinker Biddle & Reath LLP

(57) ABSTRACT

An embodiment of the invention relates to a BI-MMF with OH group concentrations controlled along a radial direction. In the BI-MMF, an OH group concentration distribution along the radial direction has a shape in which a concentration peak is located in a concentration control interval provided between an outer periphery of a core and a trench part, including an interface between the core and trench part.

7 Claims, 13 Drawing Sheets

Fig. 13

| | 30 (COMPARATIVE EXAMPLE) | OH GROUP CONCENTRATION (ppm) | | | | |
|---|---|---|---|---|---|---|
| | | 100 | 200 | 300 | 500 |
| EMB (MHz·km) | 1800 | 2000 | 2100 | 2100 | 2100 |
| 850nmOFL (MHz·km) | 1600 | 1800 | 1900 | 1900 | 1900 |
| 1300nmOFL (MHz·km) | 600 | 900 | 1100 | 1200 | 1300 |

MULTIMODE OPTICAL FIBER

BACKGROUND OF THE INVENTION

Field of the Invention

The present invention relates to a GI (Graded Index) type multimode optical fiber with bend resistance.

Related Background Art

It is known that a multimode optical fiber (hereinafter referred to as MMF: MultiMode optical Fiber) has a higher transmission loss because of its structure than a single-mode optical fiber (hereinafter referred to as SMF: Single-Mode optical Fiber) for long-haul optical transmission. On the other hand, the MMF is widely used for application of short-haul information transmission like LAN (Local Area Network) because it is easy to establish fiber-fiber connection and it becomes feasible to readily construct a network by making use of low-demand-performance equipment.

In recent years, studies have been actively conducted on technologies to reduce the aforementioned transmission loss of the MMF and on expansion of the transmission bandwidth (widening of bandwidth) thereof as well, for the purpose of improvement in signal quality in the foregoing short-haul information transmission.

SUMMARY OF THE INVENTION

The Inventor conducted the below-described research on a technology for stably manufacturing the multimode optical fiber (MMF) suitable for fast transmission, in order to realize faster short-haul information transmission than before. It is noted that in the present specification, a simple expression of "optical fiber" without any particular note shall mean "multimode optical fiber."

For stably manufacturing the MMF suitable for fast transmission, a refractive index profile in the radial direction thereof needs to accurately agree with a desired shape. For the shape of the refractive index profile, it is primarily necessary for the core to be doped with $GeO_2$ in accurate concentrations in the radial direction, but it is not always sufficient. For example, in the case of an optical fiber obtained after drawing of a preform, the refractive index profile slightly varies due to influence of residual stress inside the MMF as well. In this case, it becomes important in manufacture of the MMF how to reduce the influence of residual stress on the refractive index variation, or, to always maintain the residual stress in the same distribution. There have been neither suggestions nor teachings heretofore on checking manufacture stability from the viewpoint of residual stress. Japanese Patent Application Laid-open Publication No. 2003-315184 (Patent Literature 1) discloses a residual stress measuring device.

On the other hand, there are recent demands for speed-up of short-haul information transmission in data centers using the MMFs and it has been found that it was also extremely important to control the residual stress, particularly, in manufacture of the MMFs satisfying the OM3 and OM4 Standards of ISO/IEC11801.

Therefore, the present invention has been accomplished in order to solve the problem as described above and it is an object of the present invention to provide an MMF having a stably-manufacturable structure while ensuring fast transmission.

In passing, the MMF satisfying the OM3 Standard refers to a fiber that has the bandwidth called Effective Modal Bandwidth (EMB), of not less than 2000 MHz·km and the bandwidths for Over Filled Launch condition (OFL bandwidth) defined by International Standards IEC60793-1-41) of not less than 1500 MHz·km at 850 nm and not less than 500 MHz·km at 1300 nm. In the OM3 Standard, the MMF needs to satisfy the three conditions (OM3-1 to OM3-3) below.

EMB (850 nm)≥2000 MHz·km   (OM3-1)

OFL bandwidth (850 nm)≥1500 MHz·km   (OM3-2)

OFL bandwidth (1300 nm)≥500 MHz·km   (OM3-3)

In the OM4 Standard, the MMF needs to satisfy the three conditions (OM4-1 to OM4-3) below.

EMB (850 nm)≥4700 MHz·km   (OM4-1)

OFL bandwidth (850 nm)≥3500 MHz·km   (OM4-2)

OFL bandwidth (1300 nm)≥500 MHz·km   (OM4-3)

An embodiment of the invention relates to a GI (Graded Index) type MMF a core of which has a refractive index profile conforming to an α-profile and, more particularly, to a GI type MMF with bend resistance (which will be referred to hereinafter as BI-MMF: Bend-Insensitive MultiMode optical Fiber) wherein a low refractive index region (trench part) is provided between a core and a cladding. This MMF is definitely discriminated in terms of structure from the single-mode optical fiber for long-haul transmission.

Specifically, the BI-MMF according to the embodiment of the invention comprises the core, trench part, and cladding comprised primarily of silica glass and arranged in order along a radial direction from a center thereof. The core is a glass region with an outside diameter $2a$ extending along a predetermined axis and is doped with $GeO_2$. The trench part is a glass region with an outside diameter $2b$ surrounding an outer peripheral surface of the core and is doped with fluorine. The cladding is a glass region with an outside diameter $2c$ ($2a<2b<2c$) surrounding an outer peripheral surface of the trench part and has a refractive index lower than a maximum refractive index of the core and higher than a refractive index of the trench part. The core and the trench part may be in direct contact with each other or apart from each other at a predetermined interval. Particularly, as a first aspect, the BI-MMF is one wherein an OH (hydroxyl) group concentration distribution is controlled to a specific shape. Specifically, in a cross section of the BI-MMF perpendicular to the predetermined axis, the OH group concentration distribution along the radial direction of the BI-MMF has a shape in which a concentration peak thereof is located in a concentration control interval where a distance from a center of the core is defined in the range of a/2 to b.

In the BI-MMF, as described above, the core is doped with $GeO_2$ to form the α-profile, while the trench part is doped with fluorine to form the desired refractive index profile, for example, as shown in FIG. 1B. In this case, a portion between the core and the trench part (an interface between the core and the trench part and the vicinity thereof) comes to have a glass composition close to pure silica. Namely, the glass viscosity of this boundary region becomes higher than those of the inside portion (core side) and the outside portion (trench part side). This is also the case for an optical fiber preform before drawing, and residual stress will remain in the MMF obtained by drawing the optical fiber preform. It is known that the residual stress produced in the drawing process causes disturbance of the shape of the α-profile in the core peripheral portion (the vicinity of the interface between the core and the trench part) of the MMF. It was often the case that the conventional technologies failed to obtain the desired bandwidth due to the disturbance of the shape of the α-profile, causing decease of yield. The embodiment of the invention achieves an effect of suppressing the bandwidth degradation by attenuation of higher-order modes, even with the disturbance of the shape of the α-profile in the vicinity of the interface between the core and the trench part. Furthermore, OH groups added in a high concentration in the vicinity of the interface between the core and trench part have an effect of reducing the glass viscosity in the vicinity of the interface between the core and trench part and, as a result, the residual stress reduces in the BI-MMF after drawing.

As a second aspect applicable to the above first aspect, in the cross section of the BI-MMF, an OH group concentration at a first position separated by a distance a from the center of the core (the interface between the core and trench part and the vicinity thereof) is preferably higher than an OH group concentration at a second position separated by a distance a/2 from the center of the core and higher than an OH group concentration at a third position separated by a distance b from the center of the core (an interface between the trench part and cladding and the vicinity thereof). Namely, at the first position the doping-concentration of the impurity for adjustment of refractive index is lowered as described above (the glass composition there is close to pure silica) and, for this reason, the existence of high-concentration OH groups in the vicinity of the interface between the core and trench part is particularly effective.

As a third aspect applicable to at least either one of the above first and second aspects, the OH group concentration distribution preferably has a shape in which the OH group concentration monotonically decreases from the first position to the third position. As a fourth aspect applicable to at least any one of the above first to third aspects, when a value of the concentration peak is P, the OH group concentration distribution preferably has a shape in which a part of 0.2P is located between the first position and the third position (in the trench part). As a fifth aspect applicable to at least any one of the above first to fourth aspects, in the cross section of the multimode optical fiber a maximum OH group concentration in a rest region excluding the concentration control interval from an entire radial region ranging from the center of the core to the outer periphery of the cladding is preferably not more than 0.2P. Therefore, at least, a maximum OH group concentration in an entire area of the cladding located outside the concentration control interval is not more than 0.2P. The "rest region" includes both of the inside region from the core center to the core-center-side edge of the concentration control interval (the foregoing second position separated by the distance a/2 from the core center) and the outside region from the cladding-outer-periphery-side edge of the concentration control interval (the foregoing third position separated by the distance b from the core center) to the cladding outer periphery (the position separated by the distance c from the core center).

As a sixth aspect applicable to at least any one of the above first to fifth aspects, an OFL bandwidth at a wavelength 850 nm is preferably not less than 1500 MHz·km. The MMF adjusted so that the bandwidth is maximum around 850 nm has the bandwidth reduced around 1300 nm, whereas the BI-MMF of the embodiment of the invention can be improved in the bandwidth around 1300 nm by OH groups having an absorption peak at 1380 nm.

Furthermore, as a seventh aspect applicable to at least any one of the above first to sixth aspects, preferably, a region where the OH group concentration is not less than 100 ppm is included in the concentration control interval. This is because the foregoing effect becomes more enhanced with increase in the OH group concentration, according to Inventors' knowledge.

Each of embodiments according to the present invention will become more fully understood from the detailed description given hereinbelow and the accompanying drawings. These examples are presented by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is apparent that various modifications and improvements within the scope of the invention would be obvious to those skilled in the art from this detailed description.

BRIEF DESCRIPTION OF THE DRAWINGS

FIG. 13 is a table of a collection of transmission characteristics of a plurality of samples having their respective OH group concentration distributions with different peak values.

DETAILED DESCRIPTION OF EMBODIMENTS

Various embodiments of the multimode optical fiber according to the present invention will be described below in detail with reference to the accompanying drawings. In the description of the drawings the same elements will be denoted by the same reference signs, without redundant description.

Figure 1A:
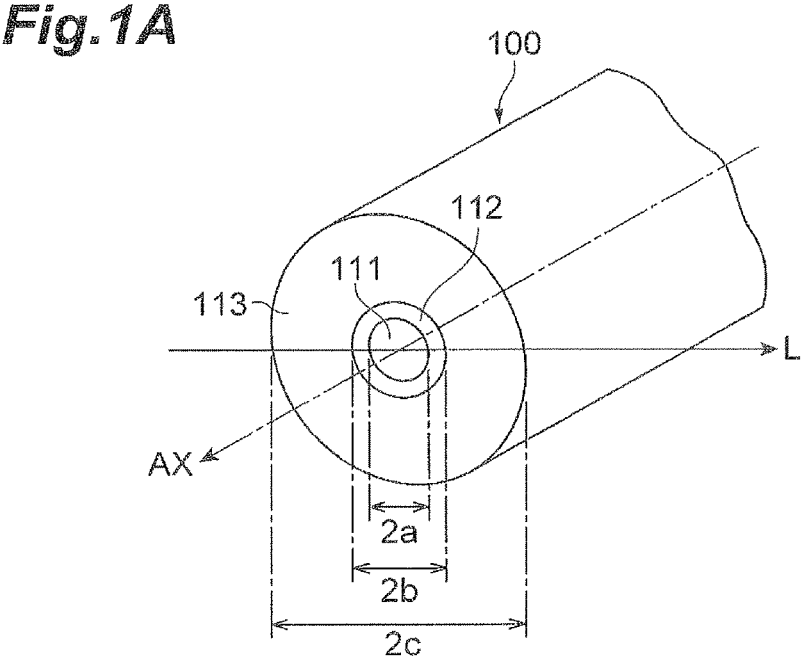
FIG. 1A is a cross-sectional view showing a structure of a BI-MMF according to the embodiment of the invention and FIG. 1B a refractive index profile thereof.
Figure 1B:
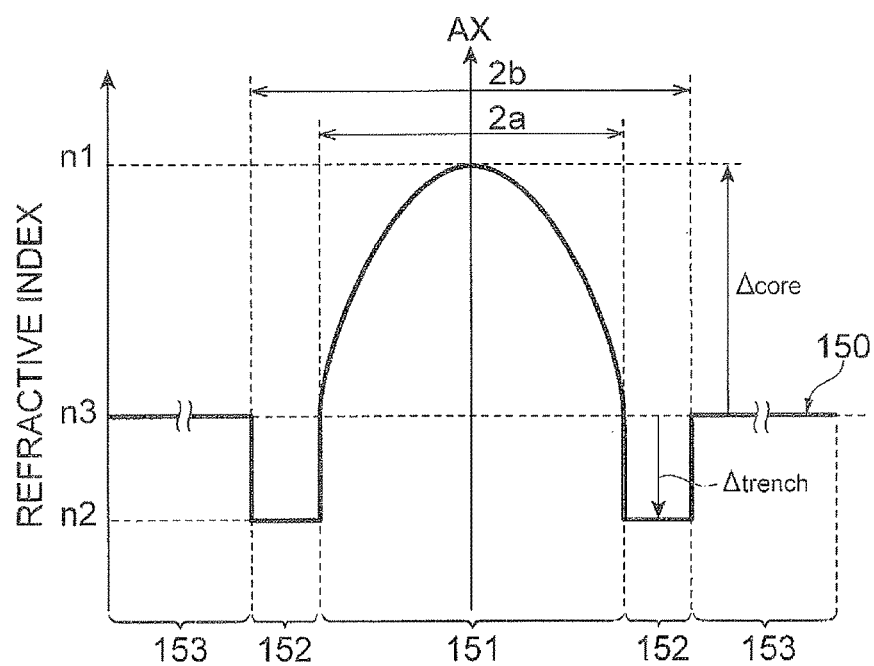

FIG. 1A is a cross-sectional view showing a structure of the multimode optical fiber according to the embodiment of the invention and FIG. 1B a refractive index profile thereof. Namely, the BI-MMF 100 according to the first embodiment, as shown in FIG. 1A, has a core 111 with an outside diameter 2$a$ extending along the optical axis AX (predetermined axis), a trench part 112 with an outside diameter 2$b$ provided on an outer peripheral surface of the core 111, and a cladding 113 with an outside diameter 2$c$ provided on an outer peripheral surface of the trench part 112. In the BI-MMF 100 shown in FIG. 1A, the core 111 is doped with GeO$_2$ for adjustment of the shape of the refractive index profile and has a maximum refractive index n1. The trench part 112 is doped with fluorine as a refractive index decreasing agent, for imparting bend resistance to the BI-MMF 100, and has a refractive index n2 (<n1). The cladding 113 is a glass region made of pure silica or doped with an impurity for adjustment of refractive index and has a refractive index n3 lower than the maximum refractive index n1 of the core 111 and higher than that of the trench part 112 (n2<n3<n1).

Furthermore, the refractive index profile 150 shown in FIG. 1B indicates the refractive indices of the respective parts on a line L perpendicular to the optical axis AX (the line L is coincident with the diameter direction of the BI-MMF 100); more specifically, region 151 indicates the refractive indices of respective portions of the core 111 along the line L, region 152 the refractive indices of respective portions of the trench part 112 along the line L, and region 153 the refractive indices of respective portions of the cladding 113 along the line L.

Particularly, the region 151 in the refractive index profile 150 in FIG. 1B has a dome shape ($\alpha$-profile), as represented by Formula (1) below, such that the refractive index n(r) becomes a maximum refractive index at a center of the core 111 coincident with the optical axis AX (or at a position where the optical axis AX intersects with a cross section of the BI-MMF 100). The refractive index n(r) represents the refractive index of the core 111 with the radius $a$ at a position separated by r in the radial direction from the center of the core 111. Therefore, the concentration of GeO$_2$ added for adjustment of refractive index also rapidly decreases from the center of the core 111 to the trench part 112 adjacent thereto. The $\alpha$ value for defining this dome shape is from 1.8 to 2.2. The relative refractive index difference $\Delta_{core}$ at the center of the core 111 with respect to the cladding 113 (which corresponds to a maximum relative refractive index difference of the core 111 with respect to the cladding 113) is from 0.8 to 2.4%. The diameter of the core 111 is from 25 to 65 μm. In the present specification, the same core structure as described above is also applied to the core structure in embodiments, a comparative example, and others described below. The relative refractive index difference $\Delta_{core}$ of the core 111 (with the refractive index n1) with respect to the cladding 113 (with the refractive index n3) is defined by Formula (2) below and the relative refractive index difference $\Delta_{trench}$ of the trench part 112 (with the refractive index n2) with respect to the cladding 113 (with the refractive index n3) is defined by Formula (3) below. The following definitions for the relative refractive index differences are also applied to the below-described embodiments, samples, and others.

$$n(r) = n1\left(1 - 2\Delta_{core}\left(\frac{r}{a}\right)^\alpha\right)^{1/2} \quad (1)$$

$$\Delta_{core} = \frac{(n1^2 - n3^2)}{2n1^2} \quad (2)$$

$$\Delta_{trench} = \frac{(n2^2 - n3^2)}{2n2^2} \quad (3)$$

Figure 2:
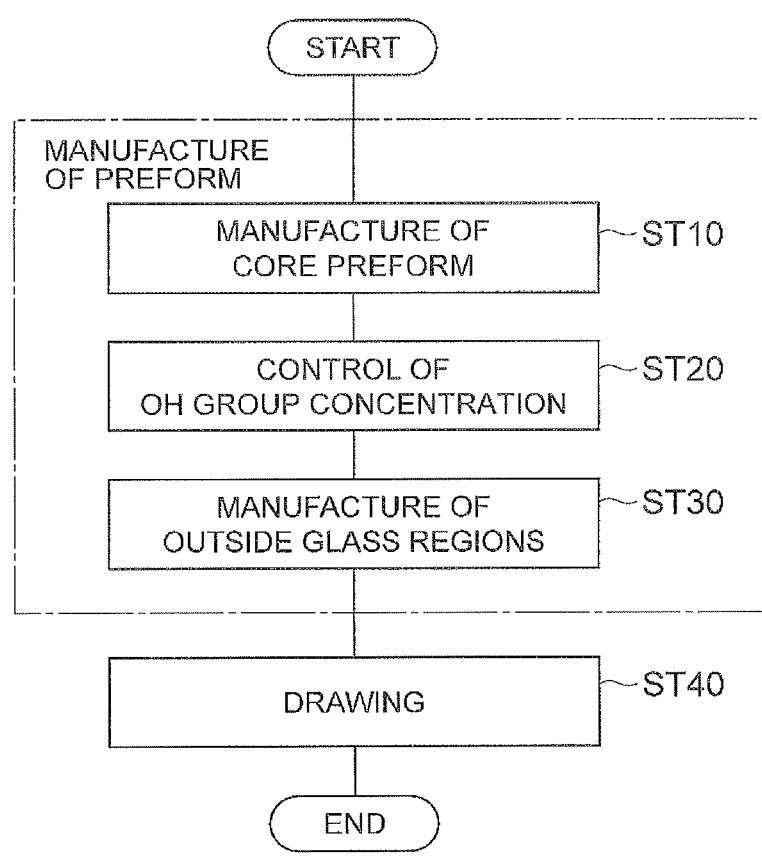
FIG. 2 is a flowchart for explaining steps for manufacturing the BI-MMF in the embodiment of the invention.
Figure 3:
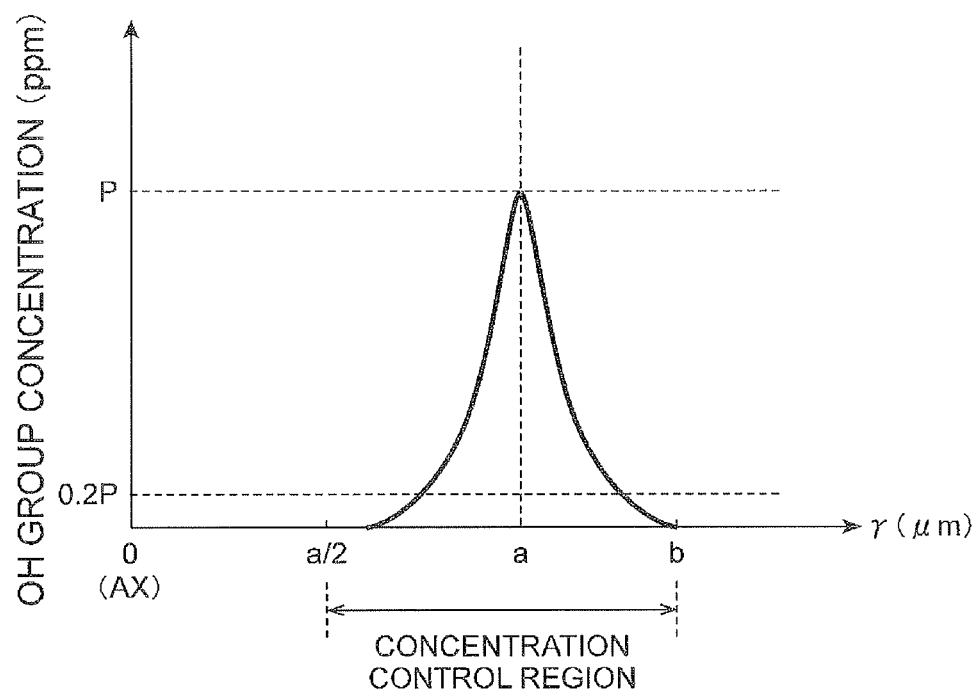
FIG. 3 is a drawing for explaining an OH group concentration distribution in the embodiment of the invention.

Next, manufacture of an optical fiber preform for the BI-MMF having the OH group concentration distribution shown in FIG. 3 will be described as an example of a method for manufacturing the BI-MMF 100 according to the present embodiment. FIG. 2 is a flowchart for explaining the steps for manufacturing the multimode optical fiber in the present embodiment. FIG. 3 is a drawing for explaining the OH group concentration distribution in the present embodiment.

Figure 10A:
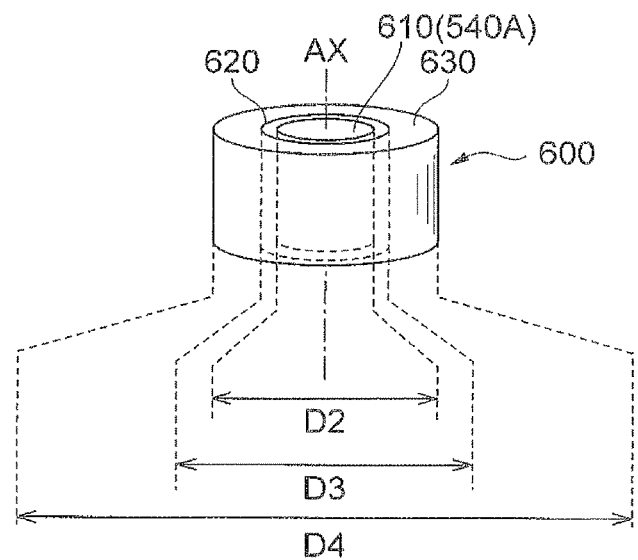
FIG. 10A is a drawing showing a structure of a resultant optical fiber preform, FIG. 10B a refractive index profile of the resultant optical fiber preform, and FIG. 10C an OH group concentration distribution along the diameter direction of the resultant optical fiber preform.
Figure 11:
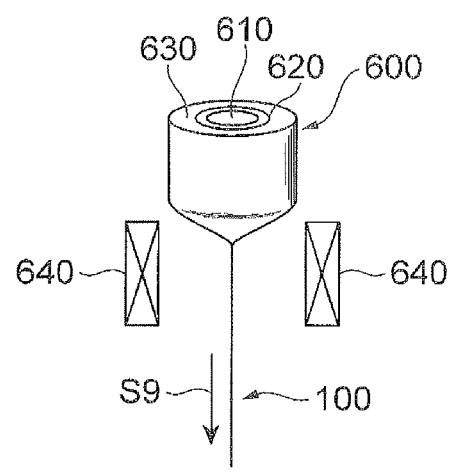
FIG. 11 is a drawing for explaining a drawing step and device configuration of the resultant optical fiber preform.

For obtaining the BI-MMF 100, an optical fiber preform 600 is first manufactured (cf. FIGS. 10A and 11). For this optical fiber preform 600, as shown in FIG. 2, a core preform corresponding to the core 111 after drawing is first manufactured through a deposition step of fine particles of glass doped with GeO$_2$ (germanium dioxide) by the VAD (Vapor phase Axial Deposition) process, a dehydration step, and a stretching step (step ST10). It is noted herein that the core preform may be manufactured by a method other than the VAD process, e.g., the OVD (Outside Vapor Deposition) process. The core preform thus obtained is treated so as to subject its surface to a blast of oxyhydrogen flame (fire polishing), thereby adjusting the OH group concentration in the core preform (step ST 20). Thereafter, outside glass regions corresponding to the trench part 112 and the cladding 113 after drawing are successively or simultaneously manufactured on the surface of the core preform after the adjustment of OH group concentration (step ST30). The optical fiber preform 600 obtained through the above steps is subjected to fiber drawing (step ST40) to obtain the BI-MMF 100 according to the present embodiment.

FIG. 3 shows the OH group concentration distribution along the radial direction resulting from the control of OH group concentration in the above step ST20. Namely, in the cross section of the BI-MMF perpendicular to the optical axis AX, the OH group concentration distribution along the radial direction has a shape in which a concentration peak thereof is located in a concentration control interval where the distance from the center of the core 111 is defined in the range of a/2 to b. Namely, an OH group concentration at a first position separated by the distance a from the center of the core 111 (an interface between the core 111 and trench part 112 and the vicinity thereof) is higher than an OH group concentration at a second position separated by the distance a/2 from the center of the core 111 and higher than an OH group concentration at a third position separated by the distance b from the center of the core 111 (an interface between the trench part and the cladding and the vicinity thereof). Particularly, when attention is focused on the shape of the trench part 112 in the OH group concentration distribution, the OH group concentration monotonically decreases from the first position to the third position.

In the OH group concentration distribution in FIG. 3, when a value of the concentration peak is P, a part of 0.2P exists between the first position and the third position (in the trench part 112). This conversely means that a maximum OH group concentration in a rest region except for the concentration control interval out of the entire radial region ranging from the center of the core 111 to the outer periphery of the cladding 113 is controlled to not more than 0.2P. In the present embodiment, therefore, at least a maximum OH group concentration in the entire area of the cladding 113 located outside the concentration control interval is not more than 0.2P. In the present specification, the "rest region" includes both of the inside region from the center of the core 111 to the core-center-side edge of the concentration control interval (the second position separated by the distance a/2 from the center of the core 111) and the outside region from the cladding-outer-periphery-side edge of the concentration control interval (the third position separated by the distance b from the center of the core 111) to the outer periphery of the cladding (the position separated by the distance c from the core center). Namely, the inside region corresponds to the core inside region from the optical axis AX to the radius a/2. The outside region corresponds to the entire region of the cladding 113.

Figure 4:
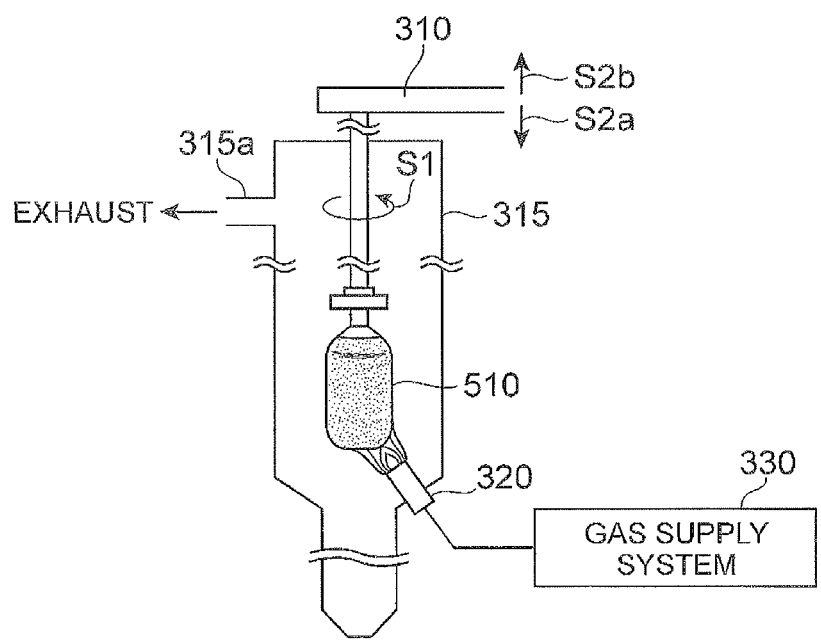
FIG. 4 is a drawing for explaining the VAD process and device configuration applied to a step of manufacturing a core preform.

Specifically, in the step of manufacturing the core preform by the VAD process (step ST10), a porous glass body 510 is formed by a soot deposition device shown in FIG. 4. This soot deposition device has at least a container 315 with an exhaust port 315a, and a support mechanism 310 for supporting the porous glass body 510. Namely, the support mechanism 310 is provided with a support rod rotatable in a direction indicated by an arrow S1 and a start rod for growth of the porous glass body 510 (soot body) is attached to a leading end of this support rod.

The soot deposition device in FIG. 4 is provided with a burner 320 for depositing the porous glass body 510 (soot body) and a gas supply system 330 supplies desired source gas (e.g., $GeCl_4$, $SiCl_4$, etc.), flaming gas ($H_2$ and $O_2$), and carrier gas such as $N_2$, Ar, or He to the burner 320.

During the manufacture of the porous glass body 510, glass fine particles are made in the flame of the burner 320 by hydrolysis reaction of the source gas supplied from the gas supply system 330 and these glass fine particles become deposited on the lower surface of the start rod. During this period, the support mechanism 310 performs an operation of once moving the start rod provided at the leading end thereof, in a direction indicated by an arrow S2a and thereafter raising the start rod along a direction indicated by an arrow S2b (the longitudinal direction of the porous glass body 510) while rotating it in the direction indicated by the arrow S1. By this operation, the porous glass body 510 grows on the lower surface of the start rod downward from the start rod, thereby obtaining a porous preform (soot preform) to become the core part 110 eventually.

Figure 5A:
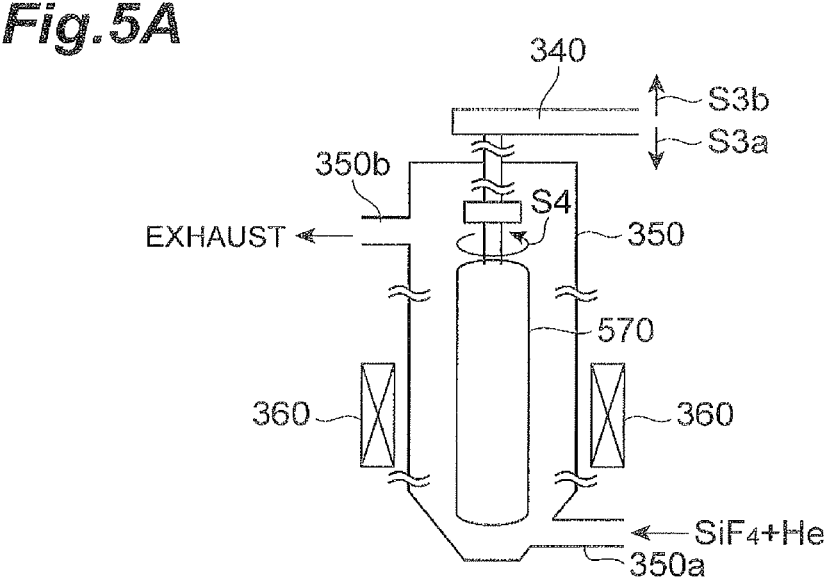
FIG. 5A is a drawing for explaining a fluorine addition step and device configuration and FIG. 5B a drawing for explaining a sintering step (transparency step) and device configuration.

Next, the dehydration step is carried out for the porous preform (porous glass body) 510 manufactured by the VAD process as described above. FIG. 5A shows the device configuration for carrying out the fluorine addition step but the dehydration step is also carried out by a device similar to it. The following description of the dehydration step is given with reference to FIG. 5A, but it should be noted that in this description of the dehydration step, a porous preform 570 in FIG. 5A is replaced by the foregoing porous preform 510 and fluorine-containing gas ($SiF_4$+He) supplied into a heating container 350 is replaced by chlorine-containing gas ($Cl_2$+He). Namely, the porous preform 510 is set in the heating container 350 with a heater 360, shown in FIG. 5A, and is subjected to the dehydration process in an atmosphere containing chlorine. This heating container 350 is provided with an inlet port 350a for supply of the chlorine-containing gas and an exhaust port 350b. During this dehydration step, the support mechanism 340, while rotating the porous preform 510 in a direction indicated by an arrow S4 around a central axis of the porous preform 510, further moves the whole of the porous preform 510 in directions indicated by arrows S3a, S3b, thereby changing the position of the porous preform 510 relative to the heater 360. A porous preform 520 is obtained through this step.

Figure 5B:
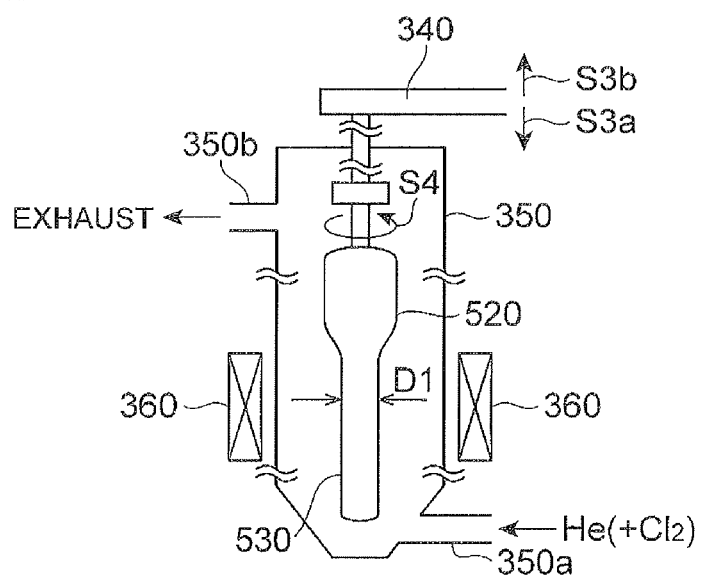

The porous preform 520 obtained through the above dehydration step is then sintered in the aforementioned heating container 350 (transparency step). Namely, as shown in FIG. 5B, the porous preform 520 is set in the container 350 while supported by the support mechanism 340. At this time, the temperature in the container 350 (heater temperature) is set to about 1500° C. and He gas is supplied through the inlet port 350a into the interior of the container 350 without introduction of chlorine gas.

During this sintering step (transparency step), the support mechanism 340, while rotating the porous preform 520 in the direction indicated by the arrow S4 around a central axis of the porous preform 520, further moves the whole of the porous preform 520 in the directions indicated by the arrows S3a, S3b, thereby changing the position of the porous preform 520 relative to the heater 360. A transparent glass body 530 with the diameter D1 is obtained through this step.

Figure 6:
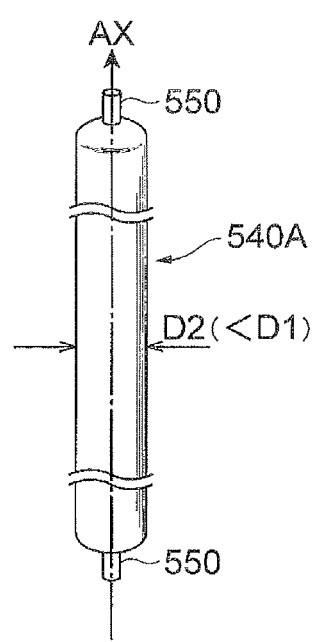
FIG. 6 is a drawing showing a structure of the core preform after stretched.

The transparent glass body 530 manufactured as described above is stretched in the longitudinal direction thereof to the diameter D2 (20 mm in the present embodiment), thereby obtaining a core preform 540A as shown in FIG. 6.

Figure 7:
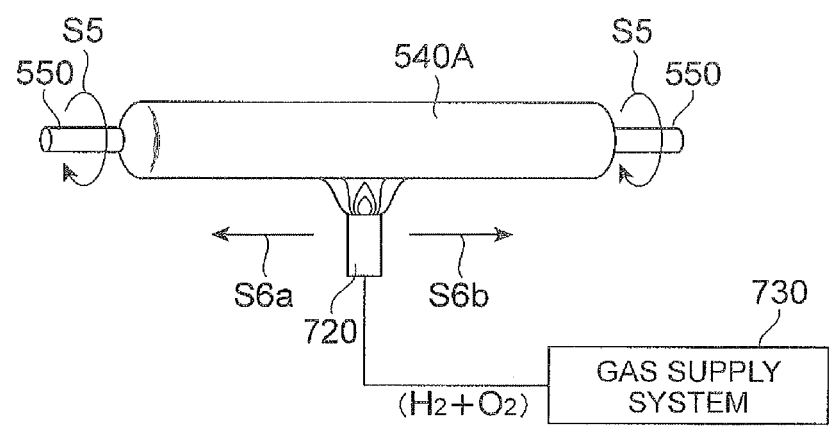
FIG. 7 is a drawing for explaining a control step of OH group concentration by oxyhydrogen flame.

Furthermore, the present embodiment includes fire polishing (with a blast of oxyhydrogen flame) to the surface of the core preform 540A obtained through each of the above steps, thereby controlling the OH group concentration distribution in the core preform 540A (step ST20). FIG. 7 shows a device for performing the control step of OH group concentration by the fire polishing with oxyhydrogen flame. The device in FIG. 7 has a burner 720 for blasting oxyhydrogen flame to the surface of the core preform 540A, and a gas supply system 730 for supplying mixed gas of hydrogen and oxygen ($H_2$+$O_2$) to the burner 720. Furthermore, the device in FIG. 7 has a rotating mechanism for rotating the core preform 540A to the two ends of which support rods 550 are attached, in a direction indicated by arrows S5, and a moving mechanism for moving the burner 720 in directions of arrows S6a, S6b.

The addition of OH groups to glass by making use of oxyhydrogen flame is disclosed in Japanese Patent Application Laid-open Publication No. S63-25242 (Patent Literature 2) and Japanese Patent Application Laid-open Publication No. 2006-117470 (Patent Literature 3). Specifically, Patent Literature 2 describes the statement that "the OH group concentration became 30 ppm by fire polishing of glass surface with oxyhydrogen flame." Furthermore, Patent Literature 3 describes the statement that "it is known that an extremely small amount of OH groups diffuse from the surface into the glass interior by the treatment of the glass surface with oxyhydrogen flame."

Figure 8A:
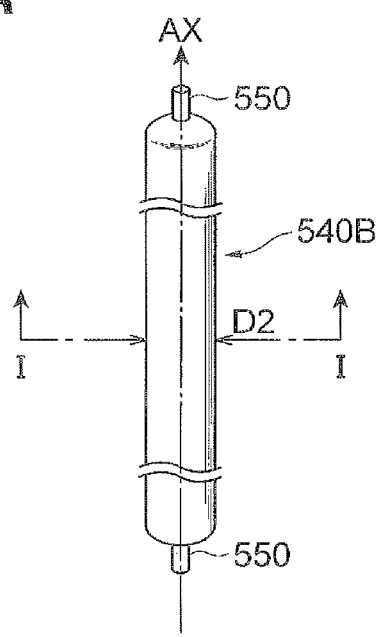
FIG. 8A shows a structure of the core preform after completion of the control step of OH group concentration, and FIG. 8B an OH group concentration distribution in a cross section along the line I-I in FIG. 8A (OH group distribution along the radial direction of the core preform).
Figure 8B:
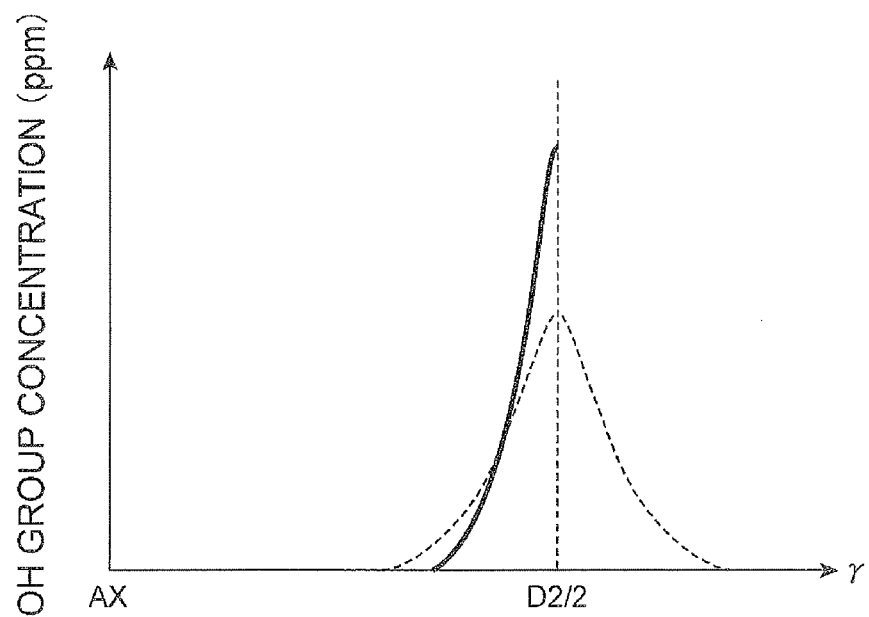

In the present embodiment, specific OH group concentrations are controlled by adjusting a moving speed of the burner 720 and the number of moving times of the burner 720 along the arrows S6a, S6b. FIG. 8A shows a core preform 540B obtained after completion of the OH group concentration control and FIG. 8B an OH group concentration distribution (solid line) along the radial direction of the core preform 540B, in a cross section of the core preform 540B along the line I-I in FIG. 8A. As shown in this FIG. 8B, a concentration peak exists near the surface of the core preform 540B (corresponding to the vicinity of the boundary between the core 111 and trench part 112 in the BI-MMF 100 after drawing) because of the blast of oxyhydrogen flame to the surface of the core preform 540B. The dashed line in FIG. 8B indicates an OH group concentration distribution in an optical fiber preform wherein glass portions corresponding to the trench part 112 and cladding 113 after drawing are formed on the outer peripheral surface of the core preform 540B, and shows change in the shape of the distribution due to diffusion of OH groups.

The Inventor prepared the core preform 540A with $\Delta_{core}$=1.0%, $\Delta_{trench}$=−0.5%, and the outside diameter 20 mm, and performed the fire polishing with oxyhydrogen flame to the surface of this core preform 540A. The conditions for the fire polishing were the moving speed of the burner 720 of 15 mm/min and the number of moving times of the burner 720 of three (one and a half strokes). The Inventor measured the maximum OH concentration in the outer peripheral portion of the core preform 540B by infrared microspectroscopy and confirmed that the maximum OH group concentration was 100 ppm.

Next, the glass portions corresponding to the trench part 112 and cladding 113 are formed by the VAD process, on the outer peripheral surface of the core preform 540B after completion of the fire polishing with oxyhydrogen flame (the control step of OH group concentration) as described above, thereby manufacturing the optical fiber preform for the BI-MMF 100 eventually (step ST30). By performing each of the aforementioned steps of deposition of glass fine particles, dehydration, and sintering, an intermediate preform with the glass portion corresponding to the trench part 112 is produced and thereafter the glass portion corresponding to the cladding 113 is formed on the outer peripheral surface of the intermediate preform. Since the same process can be applied to the manufacturing steps of the glass portion corresponding to the trench part 112 and the glass portion corresponding to the cladding 113 except for addition of fluorine, the description hereinbelow will concern the manufacture of the glass portion corresponding to the trench part 112 only, while omitting the description of the manufacture of the glass portion corresponding to the cladding 113. It is noted that the glass portion corresponding to the trench part 112 and the glass portion corresponding to the cladding 113 may be manufactured by a method other than the VAD process, e.g., the OVD process.

Figure 9:
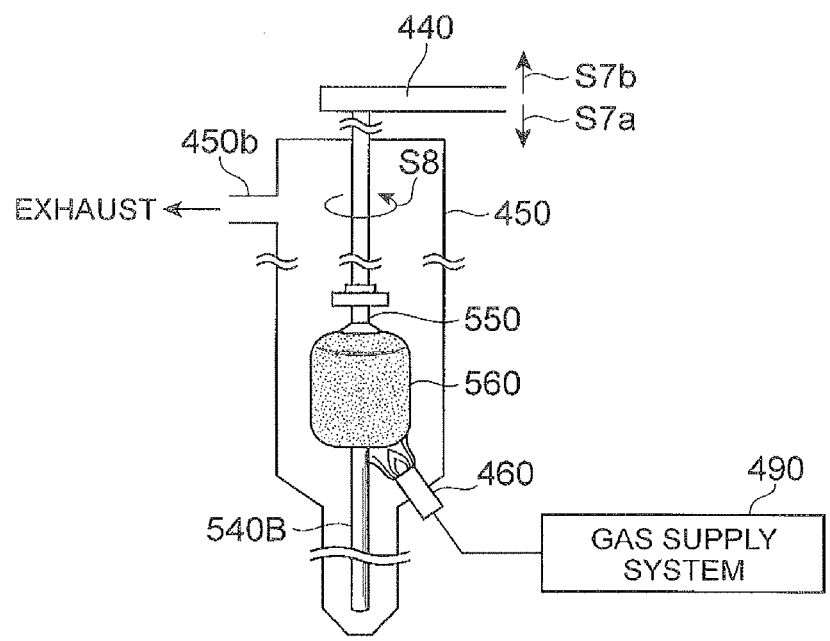
FIG. 9 is a drawing for explaining the VAD process and device configuration applied to the step of manufacturing a preform peripheral portion to become the trench part and cladding.

Specifically, in the step of manufacturing the glass portion corresponding to the trench part 112 by the VAD process, a porous glass body 560 is formed on the surface of the core preform 540B (core preform after completion of the fire polishing with oxyhydrogen flame) by a soot deposition device shown in FIG. 9 (the same structure as the soot deposition device shown in FIG. 4). This soot deposition device has at least a container 450 with an exhaust port 450b, and a support mechanism 440 for supporting the core preform 540B. Namely, the support mechanism 440 is provided with a support rod 550 rotatable in a direction indicated by an arrow S8 and the core preform 540B for growth of a porous glass body 560 (soot body) is attached to a leading end of this support rod 550.

The soot deposition device in FIG. 9 is provided with a burner 460 for depositing the porous glass body 560 (soot body) on the surface of the core preform 540B, and a gas supply system 490 supplies desired source gas (e.g., SiCl$_4$ and others), flaming gas (H$_2$ and O$_2$), and carrier gas such as N$_2$, Ar, or He to the burner 460.

During the manufacture of the porous glass body 560, glass fine particles are made in the flame of the burner 460 by hydrolysis reaction of the source gas supplied from the gas supply system 490 and these glass fine particles become deposited on the surface of the core preform 540B. During this period, the support mechanism 440 performs an operation of once moving the core preform 540B provided at the leading end thereof, in a direction indicated by an arrow S7a and thereafter raising the core preform 540B along a direction indicated by an arrow S7b (the longitudinal direction of the core preform 540B) while rotating it in the direction indicated by the arrow S8. By this operation, the porous glass body 560 grows on the surface of the core preform 540B downward from the core preform 540B, thereby finally obtaining a porous preform (soot preform) 570 including the porous glass body 560 corresponding to the trench part 112, as shown in FIG. 5A.

Figure 10B:
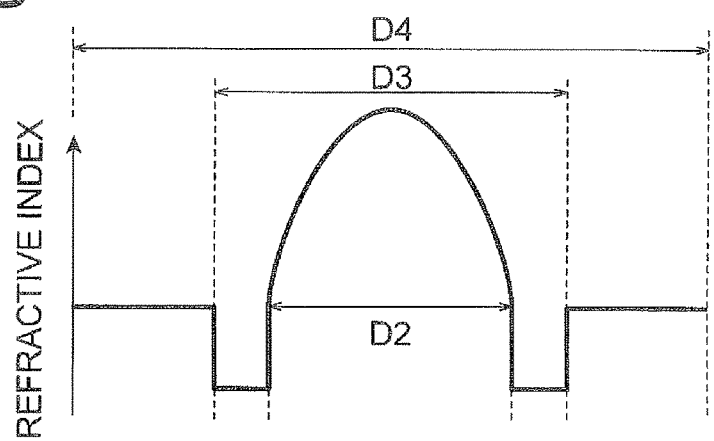
Figure 10C:
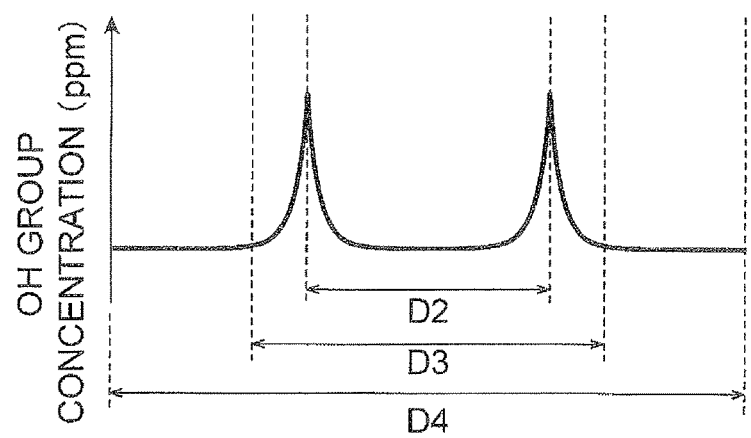

The fluorine addition step (FIG. 5A) and sintering step (FIG. 5B) are carried out for the porous preform 570 obtained through the above deposition step. The fluorine addition step is carried out by supplying fluorine-containing gas, e.g., gas such as SF$_6$ or SiF$_4$ together with inert gas such as He gas into the container 350 (reference can be made to the description of the aforementioned dehydration step, as to the specific configuration of the device shown in FIG. 5A). The fluorine addition step and sintering step (transparency step) may be performed separately or simultaneously. It results in obtaining an intermediate preform with the glass portions corresponding to the core 111 and trench part 112. Furthermore, the glass portion corresponding to the cladding 113 is formed on the surface of this intermediate preform, thereby obtaining the optical fiber preform 600 for the BI-MMF 100. The optical fiber preform 600 obtained through the above steps has, as shown in FIG. 10A, an inside region 610 with an outside diameter D2 to become the core 111 after drawing, an intermediate region 620 with an outside diameter D3 to become the trench part 112, and a peripheral region 630 with an outside diameter D4 to become the cladding 113. A refractive index profile of the optical fiber preform 600, as shown in FIG. 10B, has a similarity shape to the shape of the refractive index profile 150 shown in FIG. 1B and an OH group concentration distribution thereof is, as shown in FIG. 10C, of a shape having a concentration peak in the vicinity of a boundary between the inside region 610 and the intermediate region 620 (which corresponds to the vicinity of the boundary between the core 111 and the trench part 112).

Thereafter, in the drawing step shown in FIG. 11, one end of the optical fiber preform 600 is drawn in a direction indicated by an arrow S9 while heated by a heater 640, thereby obtaining the BI-MMF 100 having the cross-sectional structure shown in FIG. 1A.

Figure 12A:
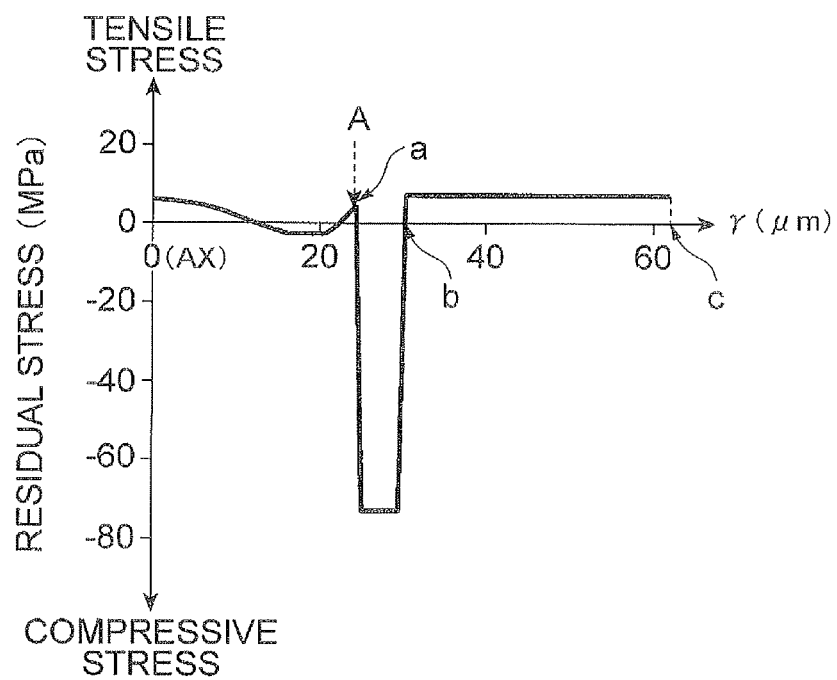
FIG. 12A is a residual stress profile along the radial direction in an ordinary BI-MMF (BI-MMF obtained without control of OH group concentration along the radial direction), and FIG. 12B a graph showing a relationship between OH group concentration and residual stress, in the vicinity of the interface between the core and trench part.
Figure 12B:
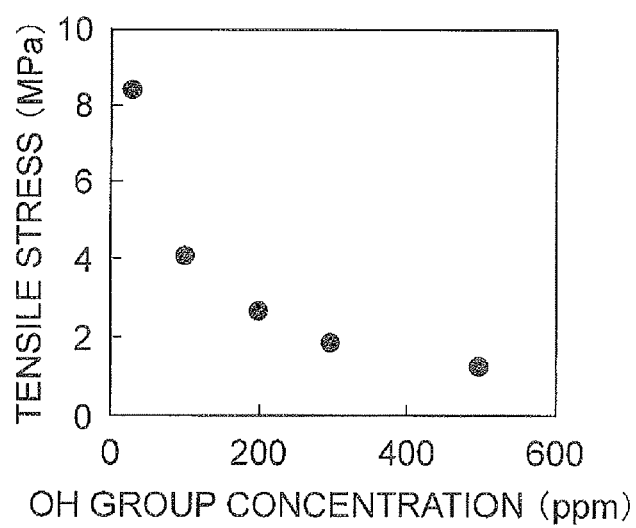

An ordinary BI-MMF (BI-MMF obtained without execution of the OH group concentration control along the radial direction) has a residual stress profile along the radial direction, as shown in FIG. 12A. Namely, in the ordinary BI-MMF, tensile stress is generated in the vicinity of the interface between the core and trench part (part A in FIG. 12A) and causes the shape of the α-profile to deviate from designed values in the outer periphery of the core. On the other hand, it is also seen, as shown in FIG. 12B, that the tensile stress at the part A significantly decreases with increase of OH group concentration. It is noted herein that the examples of FIGS. 12A and 12B show the data about samples of the BI-MMF with $\Delta_{core}$=1.0%, $\Delta_{trench}$=−0.5%, the core outside diameter 2a=50 μm, the trench outside diameter 2b=60 μm, and the cladding outside diameter 2c=125 μm.

It is expected, therefore, that the present embodiment has an effect of reducing the change in refractive index profile due to residual stress by increasing the OH group concentration in the outer periphery of the core 111 in the BI-MMF 100 and, particularly, in the vicinity of the interface between the core and trench part (because the residual stress in the BI-MMF after drawing is reduced by decrease of glass viscosity in the vicinity of the interface). Furthermore, it is also expected that the present embodiment has an effect of increasing the propagation loss of higher-order modes at the wavelength 1300 nm because of the increase of the OH group concentration in the vicinity of the core-trench part interface (effect of increasing the bandwidth at 1300 nm). Namely, OH group absorption has absorption peaks at 1380 nm, 1250 nm, and 940 nm, which are wavelengths close to 850 nm and 1300 nm of main transmission wavelength bands of MMF. Among them, the OH group absorption is highest at the wavelength 1380 nm and the tail of the absorption waveform at the wavelength 1380 nm extends to the wavelength 1300 nm, which also increases the loss at 1300 nm. However, an optical power distribution of much higher-order modes is deflected more to the outer periphery of the core 111 and, as a result, the present embodiment shows prominent increase of the propagation loss of higher-order modes, enabling increase of bandwidth. This effect is significant in the MMF with a refractive index profile designed to have the widest bandwidth as a bandwidth at the wavelength 850 nm.

FIG. 13 is a table of a collection of transmission characteristics of a plurality of samples having their respective OH group concentration distributions with different peak values. The prepared samples are the BI-MMFs having the fundamental configuration of $\Delta_{core}$=1.0%, $\Delta_{trench}$=−0.5%, the core outside diameter $2a$=50 μm, the trench outside diameter $2b$=60 μm, and the cladding outside diameter $2c$=125 μm. The prepared samples have their respective OH group concentration peaks of 100 ppm, 200 ppm, 300 ppm, and 500 ppm in the vicinity of the core-trench part interface, which were set by changing the fire polishing conditions in the manufacture of the optical fiber preform. Furthermore, FIG. 13 also shows an example of a sample with the OH group concentration peak of 30 ppm in the vicinity of the core-trench part interface (sample obtained by performing the fire polishing only once), as a comparative example.

As also seen from this FIG. 13, the sample with the OH group concentration peak of 100 ppm showed the effective modal bandwidth (EMB) of 2000 MHz·km, the OFL bandwidth at the wavelength 850 nm of 1800 MHz·km, and the OFL bandwidth at the wavelength 1300 nm of 900 MHz·km. The sample with the OH group concentration peak of 200 ppm showed the EMB of 2100 MHz·km, the OFL bandwidth at the wavelength 850 nm of 1900 MHz·km, and the OFL bandwidth at the wavelength 1300 nm of 1100 MHz·km. The sample with the OH group concentration peak of 300 ppm showed the EMB of 2100 MHz·km, the OFL bandwidth at the wavelength 850 nm of 1900 MHz·km, and the OFL bandwidth at the wavelength 1300 nm of 1200 MHz·km. The sample with the OH group concentration peak of 500 ppm showed the EMB of 2100 MHz·km, the OFL bandwidth at the wavelength 850 nm of 1900 MHz·km, and the OFL bandwidth at the wavelength 1300 nm of 1300 MHz·km.

On the other hand, the sample with the OH group concentration peak of 30 ppm as the comparative example showed the EMB of 1800 MHz·km, the OFL bandwidth at the wavelength 850 nm of 1600 MHz·km, and the OFL bandwidth at the wavelength 1300 nm of 600 MHz·km.

As described above, it is confirmed by comparison between the samples of the embodiment and the sample of the comparative example that the OH group concentration peak is preferably not less than 100 ppm, in order to achieve significant improvement in the OFL bandwidth at the wavelength 1300 nm. When the OH group concentration peak is not less than 100 ppm, the BI-MMF is obtained as one satisfying the OM3 Standard of ISO/IEC11801 (the OFL bandwidth at the wavelength 850 nm not less than 1500 MHz·km).

From the above description of the present invention, it would be obvious that the present invention may be varied in many ways. Such variations are not to be regarded as a departure from the spirit and scope of the invention, and all improvements as would be obvious to those skilled in the art are intended for inclusion within the scope of claims which follows.

What is claimed is:

1. A multimode optical fiber comprising:
a core extending along a predetermined axis, doped with $GeO_2$, and having an outside diameter $2a$;
a trench part surrounding an outer peripheral surface of the core, doped with fluorine, having a refractive index lower than a maximum refractive index of the core, and having an outside diameter $2b$; and
a cladding surrounding an outer peripheral surface of the trench part, having a refractive index lower than the maximum refractive index of the core and higher than the refractive index of the trench part, and having an outside diameter $2c$,
wherein in a cross section of the multimode optical fiber perpendicular to the predetermined axis, an OH group concentration distribution along a radial direction of the multimode optical fiber has a shape in which a concentration peak thereof is located in a concentration control interval where a distance from a center of the core is defined in the range of a/2 to b.

2. The multimode optical fiber according to claim 1, wherein in the cross section of the multimode optical fiber, an OH group concentration at a first position separated by a distance a from the center of the core is higher than an OH group concentration at a second position separated by a distance a/2 from the center of the core and higher than an OH group concentration at a third position separated by a distance b from the center of the core.

3. The multimode optical fiber according to claim 2, wherein the OH group concentration distribution has a shape in which the OH group concentration monotonically decreases from the first position to the third position.

4. The multimode optical fiber according to claim 2, wherein when a value of the concentration peak is P, the OH group concentration distribution has a shape in which a part of 0.2P exists between the first position and the third position.

5. The multimode optical fiber according to claim 2, wherein in the cross section of the multimode optical fiber, a maximum OH group concentration in an entire area of the cladding located outside the concentration control interval is not more than 0.2P.

6. The multimode optical fiber according to claim 1, wherein a bandwidth for an Over Filled Launch condition at a wavelength of 850 nm is not less than 1500 MHz·km.

7. The multimode optical fiber according to claim 1, wherein a region where the OH group concentration is not less than 100 ppm is included in the concentration control interval.

* * * * *